United States Patent
Koide et al.

(10) Patent No.: US 9,413,732 B2
(45) Date of Patent: Aug. 9, 2016

(54) VEHICLE NETWORK SYSTEM

(75) Inventors: Shohei Koide, Tokyo (JP); Yuji Ninagawa, Handa (JP); Noriaki Inoue, Kobe (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/002,542

(22) PCT Filed: Mar. 2, 2012

(86) PCT No.: PCT/IB2012/000389
§ 371 (c)(1),
(2), (4) Date: Oct. 17, 2013

(87) PCT Pub. No.: WO2012/120350
PCT Pub. Date: Sep. 13, 2012

(65) Prior Publication Data
US 2014/0040992 A1  Feb. 6, 2014

(30) Foreign Application Priority Data
Mar. 4, 2011  (JP) .................................. 2011-048020

(51) Int. Cl.
*G06F 7/04* (2006.01)
*H04L 29/06* (2006.01)
(Continued)

(52) U.S. Cl.
CPC .............. *H04L 63/06* (2013.01); *H04L 9/3242* (2013.01); *H04L 9/3247* (2013.01);
(Continued)

(58) Field of Classification Search
CPC .......... H04L 63/06; H04L 67/12; H04L 69/08
USPC ................ 726/4, 1, 22, 26, 34; 713/169, 156; 709/223
See application file for complete search history.

(56) References Cited

U.S. PATENT DOCUMENTS 6,044,468 A * 3/2000 Osmond ............. H04L 41/0213
 380/281
6,122,277 A * 9/2000 Garmire ............. H04L 12/1868
 370/390

(Continued)

FOREIGN PATENT DOCUMENTS

EP    2 136 308 A1    12/2009
JP    2005-1534 A     1/2005

(Continued)

OTHER PUBLICATIONS

André Groll, et al., "Secure and Authentic Communication on Existing In-Vehicle Networks", IEEE Intelligent Vehicles Symposium, XP 031489997, Jun. 3, 2009, pp. 1093-1097.

*Primary Examiner* — Abu Sholeman
(74) *Attorney, Agent, or Firm* — Oblon, McClelland, Maier & Neustadt, L.L.P

(57) ABSTRACT

In a vehicle network system, a plurality of ECUs are network-connected. The plurality of ECUs include a first ECU that has set therein a secret key from among the secret key and a public key that form a pair and are set on the basis of initialization processing performed when the vehicle network system is created, and a second ECU that has set therein the public key. The second ECU adds, to a transmission signal, an authentication keyword created from the public key and information capable of specifying the second ECU and transmits the transmission signal with the authentication keyword added thereto to the network. The first ECU acquires the authentication keyword and estimates the reliability of the communication signal on the basis of the acquired authentication keyword and the secret key.

12 Claims, 12 Drawing Sheets

(51) Int. Cl.
*H04L 9/32* (2006.01)
*H04L 12/403* (2006.01)
*H04L 29/08* (2006.01)
*G06F 15/173* (2006.01)
*H04L 12/40* (2006.01)

(52) U.S. Cl.
CPC ......... *H04L 12/403* (2013.01); *H04L 63/0442* (2013.01); *H04L 63/0869* (2013.01); *H04L 63/123* (2013.01); *H04L 67/12* (2013.01); *H04L 2012/40215* (2013.01); *H04L 2012/40273* (2013.01); *H04L 2209/84* (2013.01)

(56) References Cited

U.S. PATENT DOCUMENTS

| | | | | |
|---|---|---|---|---|
| 6,754,811 | B1* | 6/2004 | Cato | G06F 9/4411 709/202 |
| 6,810,269 | B1* | 10/2004 | Aramaki | 455/560 |
| 7,100,196 | B2* | 8/2006 | Fredriksson | G05B 19/042 709/208 |
| 8,035,508 | B2* | 10/2011 | Breed | B60C 11/24 340/539.11 |
| 8,139,577 | B2* | 3/2012 | Wang | A61B 5/0002 370/389 |
| 8,190,727 | B2* | 5/2012 | Henkel | 709/208 |
| 8,327,130 | B2* | 12/2012 | Wilkinson, Jr. | H04L 63/0807 713/155 |
| 8,549,606 | B2* | 10/2013 | Saito | H04N 7/1675 380/200 |
| 8,817,706 | B2* | 8/2014 | Ichihara | H04L 12/6418 370/328 |
| 8,914,636 | B2* | 12/2014 | Cha | H04L 63/0815 713/171 |
| 8,964,906 | B1* | 2/2015 | Moore | G06F 9/00 375/316 |
| 2002/0112016 | A1* | 8/2002 | Peshkin | G05B 19/41815 709/208 |
| 2003/0163692 | A1* | 8/2003 | Kleinsteiber | H04L 63/08 713/169 |
| 2004/0003236 | A1* | 1/2004 | Jakobsson | H04L 9/3218 713/156 |
| 2004/0003237 | A1 | 1/2004 | Puhl et al. | |
| 2004/0249985 | A1* | 12/2004 | Mori | G06F 3/0613 709/250 |
| 2005/0151619 | A1* | 7/2005 | Forest | B60R 25/04 340/5.26 |
| 2006/0005233 | A1* | 1/2006 | Kleinsteiber | H04L 63/08 726/4 |
| 2006/0090204 | A1 | 4/2006 | Ogiso | |
| 2006/0212703 | A1 | 9/2006 | Kojima | |
| 2007/0061572 | A1 | 3/2007 | Imai et al. | |
| 2007/0118752 | A1 | 5/2007 | Kiessling et al. | |
| 2007/0138277 | A1* | 6/2007 | Kazama | G06K 17/0022 235/439 |
| 2007/0162738 | A1* | 7/2007 | Kim | G06G 5/003 713/100 |
| 2009/0070617 | A1* | 3/2009 | Arimilli | G06F 1/12 713/400 |
| 2009/0119657 | A1* | 5/2009 | Link, II | G06F 8/65 717/171 |
| 2010/0010698 | A1* | 1/2010 | Iwashita | B60L 3/12 701/22 |
| 2010/0074236 | A1* | 3/2010 | Takeda | H04W 24/04 370/338 |
| 2010/0121986 | A1* | 5/2010 | Blanton | H04W 4/18 709/250 |
| 2010/0189102 | A1* | 7/2010 | Wang | A61B 5/0002 370/389 |
| 2011/0072123 | A1* | 3/2011 | Hsu | B60K 37/02 709/223 |
| 2011/0083161 | A1 | 4/2011 | Ishida et al. | |
| 2011/0140835 | A1* | 6/2011 | Ishibashi | B60L 11/1824 340/5.2 |
| 2012/0124179 | A1* | 5/2012 | Cappio | H04L 65/104 709/219 |
| 2012/0170560 | A1* | 7/2012 | Han | G01S 5/0252 370/338 |
| 2013/0311658 | A1* | 11/2013 | Solomon | G06Q 10/06 709/225 |
| 2015/0373158 | A1* | 12/2015 | Kim | H04L 67/12 709/223 |

FOREIGN PATENT DOCUMENTS

| | | |
|---|---|---|
| JP | 2006-260490 A | 9/2006 |
| JP | 2008-189209 A | 8/2008 |
| JP | 2009-205430 A | 9/2009 |
| WO | WO 2005/041474 A1 | 5/2005 |
| WO | WO 2009/147734 A1 | 12/2009 |

* cited by examiner

AUTHENTICATION KEYWORD

DATA FORMAT

VEHICLE NETWORK SYSTEM

BACKGROUND OF THE INVENTION

1. Field of the Invention

The invention relates to vehicle network system in which a plurality of electronic control units installed on a vehicle are network-connected to each other and exchange information.

2. Description of Related Art

By connecting a plurality of electronic control units (ECUs) installed on a vehicle to each other via network, it is possible to configure a vehicle network system that will enable the exchange of information (vehicle information) possessed by the ECUs. In such vehicle network system, vehicle information usually can be easily exchanged between the network-connected ECUs. Meanwhile, it is also easy to detach, by mistake or intentionally, a device connected to the network or attach, by mistake or intentionally, a device to the network. Thus, where a device is unexpectedly detached from the network or an unanticipated device is attached to the network, unauthorized access to the network can occur or the exchange of vehicle information can be affected. Accordingly, Japanese Patent Application Publication No. 2005-1534 (JP 2005-1534 A) describes an example of a system that can be adapted to the case where an ECU constituting a vehicle network system is removed by detachment or the like.

In the system described in JP 2005-1534 A, a vehicle network system is assumed in which, for example, a communication ECU, an engine ECU, a car navigation ECU, and an air conditioner ECU are communicatively connected to each other by a network (communication lines). Because of connection recognition performed by each. ECU in such system, when connection with any ECU (installed device) is detected to be abnormal, the operation of this device or other ECU (installed device) is stopped. Thus, when any installed device is detached from the vehicle, other installed devices are prevented from operating normally as a device group. As a result, an unauthorized action including the detachment of devices, that is, the vehicle theft in this case, is effectively prevented.

Thus, the system described in JP 2005-1534 A can be adapted to the case where a device is detached, but can not be necessarily adapted adequately to the case in which an unauthorized device is added. Therefore, the system cannot ensure security against frequent unauthorized access associated with the addition of devices, such as replay attack in which aliases generated by an unauthorized use of normal signals that have been transmitted to the network are transmitted to the network.

For example, in a control area network (CAN), which is often used as a vehicle network, a transmitting device transmits signals assigned with an identifier (CAN ID) that has been allocated to the transmitting device, and a receiving device determines the device that has transmitted the signal and the contents of the signal on the basis of the identifier added to the signal. In a case where a transmission signal TD110 including an identifier "XX" and data "123 . . . " is outputted from an ECU_A110 as a transmitting device to a network 120, as shown in FIG. 12A, an ECU_B111, an ECU_C112, and an ECU_N113 are function as receiving devices usually obtain reception signals RD111 to RD113 including the identifier "XX" and data "123 . . . " that are based on the transmission signal TD110. Meanwhile, where a improper ECU_A130 is connected to a network system 100, as shown in FIG. 12B, the improper ECU_A130 can output a transmission signal TD130 including improper data "999 . . . " by using the identifier "XX" used by the ECU_A110, which is a normal transmitting device. As a result, the ECU_B111, ECU_C112, and ECU_N113 obtain reception signals RD131 to RD133 including the identifier "XX" and improper data "999 . . . ". In this case, although the transmission signal is that of the improper ECU_A130, the ECU_B111, ECU_C112, and ECU_N113 determine that this signal is from the ECU_A110 and perform processing based on the improper data. Thus, by an unauthorized access to the network system 100 constituted by the CAN, the improper ECU_A130 can pretend to be the normal ECU_A110, and following recent progress in the field of networking, this also becomes a problem for vehicles.

In a system with high processing capacity of devices or high data transfer capacity of the network, an unauthorized access can be apparently prevented by using a high-level encryption protocol, such as Secure Socket Layer (SSL), that performs encryption each time a signal is transmitted and received, but since high-load computations are required for processing of the high-level encryption protocol, it is unrealistic to use a protocol requiring such high-load computations in a vehicle network system in which computation capacity and data transfer capacity are reduced a necessary minimum limit.

SUMMARY OF THE INVENTION

The invention provides a vehicle network system that can appropriately ensure the reliability of communication signals under limited communication capacity conditions between a plurality of network-connected electronic control units.

In a vehicle network system according to the first aspect of the invention, a plurality of control units are provided on a vehicle and network-connected to each other communicatively. The vehicle network system is provided with a plurality of control units that are provided on a vehicle and network-connected to each other communicatively. The plurality of control units includes a first control unit that has set therein a secret key from among the secret key and a public key that form a pair and are set by execution of initialization processing for activating the system, and a second control unit that has set therein the public key. The second control unit is configured to create authentication information from the public key and information capable of specifying the second control device unit, add the authentication information to a communication signal to be transmitted to another control unit, and transmit the communication signal with the authentication information added thereto to the network. The first control unit is configured to acquire the authentication information that has been added to the communication signal transmitted from the second control unit and estimate reliability of the communication signal on the basis of the acquired authentication information and the secret key.

According to the above-described first aspect, since the public key is set when the initialization processing is executed, a unit that transmits the communication signal together with the authentication information is specified as a unit included in the vehicle network system when the initiation processing is executed. As a result, since the transmitted communication signal that has the authentication information added thereto is thus specified as a signal transmitted from the unit included in the vehicle network system during the initialization processing, the reliability thereof is ensured. As a result, the reliability of the communication signal can be increased.

Where the authentication information that has thus been once created is stored, it is not necessary to create this authentication information again, and during subsequent transmission of communication signals, the processing capacity of the second control unit can be maintained at the conventional level, without adding a load required for creating the authentication information.

Further, since the contents of the authentication information that has been encrypted by the public key are not falsified, the reliability of the communication signal having the authentication information added thereto can be also increased.

In the first aspect, the second control unit may be configured to divide the authentication information into a plurality of information pieces, successively add the divided authentication information that has been obtained by division to communication signals, and transmit the communication signals with the divided authentication information added thereto. The first control unit may be configured to receive successively the communication signals, reconfigure the authentication information before the division from the divided authentication information and estimate reliability of the communication signals on the basis of the reconfigured authentication information.

With the above-described configuration, since the divided authentication information is transmitted, the volume of communication data necessary to ensure the reliability can be reduced by comparison with the case in which the entire authentication information is added to each transmitted communication signal. In particular, in the case of a vehicle network system which is designed to have a minimal required capacity and functions, the reliability of the communication signals can be increased while suppressing the increase in cost associated with functional enhancement for increasing the reliability of the communication signals.

In the above-described aspect, the first control unit may be configured to generate the secret key and the public key by execution of the initialization processing and may set the secret key to the first control unit itself and set the public key to the second control unit.

With the abovementioned configuration, since the first control unit generates the secret key and the public key when the initialization processing is executed, the possibility of the information on secret key and public key leaking beforehand is eliminated.

In the above-described aspect, the first control unit may set the public key to the second control unit via the network.

With the abovementioned configuration, the public key can be accurately and effectively distributed to the appropriate control unit constituting the vehicle network system.

In the above-described aspect, the second control unit may create the authentication information at a timing at which the public key is set.

With the abovementioned configuration, since the authentication information is created when the public key is set, no processing load associated with the creation of authentication information is generated when the communication signals are transmitted and the increase in processing load in the second control unit is prevented.

In the above-described aspect, after creating the authentication information, the second control unit may delete the public key that has been set.

With the abovementioned configuration, since the public key itself is not necessary after the authentication information has been created, leak of the public key is prevented and the reliability of the communication signal is further increased by leaving the authentication information, which is used for estimating the reliability of the communication signal, and deleting the public key.

In the above-described aspect, the second control unit may transmit the authentication information to the network prior to transmitting the communication signal each time the vehicle network system is started, and the first control unit may be configured to acquire and store the authentication information that has been received prior to receiving the communication signal from the second control unit and to estimate reliability of the communication signal by comparing the stored authentication information with the authentication information added to the communication signal.

With the abovementioned configuration, the first control unit can perform the reliability estimation of the communication signal by authenticating the control unit that transmits the communication signal necessary for estimating the reliability by authentication information transmitted prior to the transmission of the communication signal each time the vehicle network system is started, without being affected, for example, by changes in system configuration. Further, in this case, a control unit that transmits a communication signal for which the estimation of the reliability is necessary is not required to be registered in advance in the first control unit. Therefore, flexibility of the system is also increased.

In the above-described aspect, the first control unit may be configured to prohibit use of a communication signal transmitted by the second control unit in the vehicle network system when determining that the communication signal is unreliable.

With the abovementioned configuration, when a unit pretending to be the second control unit is connected to the vehicle network system and an unauthorized signal is transmitted to the vehicle network system, the effect of the unauthorized signal is eliminated from the vehicle network system. As a result, the possibility of the unauthorized signal adversely affecting the vehicle network system can be suppressed.

In a vehicle network system according to the second aspect of the invention, a plurality of control units provided on a vehicle are network-connected to each other communicatively. The vehicle network system includes a plurality of control units provided on the vehicle and network-connected to each other communicatively, the plurality of control units includes a first control unit that has set therein a secret key from among the secret key and a public key that form a pair and are set by execution of initialization processing for activating the system, and a second control unit that has set therein the public key. The first control unit is configured to transmit a communication signal to another control unit via the network and also transmit an authentication signal created on the basis of the secret key and original authentication data generated on the basis of the communication signal, and the second control unit is configured to receive the communication signal and the authentication signal and estimate reliability of the communication signal on the basis of comparison of reproduced authentication data generated on the basis of the received communication signal and decoded authentication data decoded on the basis of the authentication signal and the public key.

With the abovementioned configuration, since the public key is set when the initialization processing is executed, the first control unit that transmits the public key is specified as a device that has been included in the vehicle network system at the execution of the initialization processing. The second control unit can determine that the transmission origin of the communication signal is the first control unit and that the communication signal has not been falsified by comparing the reproduced authentication data generated from the communication signal and decoded authentication data obtained by decoding the authentication signal of the first control unit. For example, where the communication signal flowing in the network has been falsified, the authentication data corresponding thereto cannot be falsified. Therefore, the falsification of the communication signal can be detected. As a result, it is possible to detect a fake signal from a device pretending to be the first control unit and the reliability of the communication signal can be increased.

Further, since the communication signal from the first control unit is itself also transmitted to the network, the other control unit that does not estimate the reliability of the communication signal can be conventionally used to receive the communication signal from the first control unit. Therefore, the system for estimating the reliability of the communication signals can be also easily applied to the already existing vehicle network systems.

In the above-described second aspect, the first control unit may be configured to generate the authentication signal by encrypting, with the secret key, the original authentication data calculated by applying a hash function to the communication signal, and the second control unit may be configured to calculate the reproduced authentication data by applying the hash function to the received communication signal and estimate the reliability of the communication signal on the basis of comparison of the reproduced authentication data with decoded authentication data obtained by decoding the authentication signal.

With the abovementioned configuration, authentication data of adequate size (intensity) can be calculated from the communication signal by using a hash function. As a result, the flexibility in designing vehicle network systems is increased.

In the above-described aspect, the first control unit may be configured to generate the secret key and the public key by execution of the initialization processing and may set the secret key to the first control unit itself and set the public key to the second control unit.

With the abovementioned configuration, since the first control unit generates the secret key and the public key when the initialization processing is executed, the possibility of the information on secret key and public key leaking beforehand is eliminated.

In the above-described aspect, the first control unit may set the public key to the second control unit via the network.

With the abovementioned configuration, the public key can be accurately and effectively distributed to the appropriate control unit constituting the vehicle network system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

The first embodiment of the vehicle network system in accordance with the invention will be explained below with reference to FIGS. 1 to 3.

Figure 1:
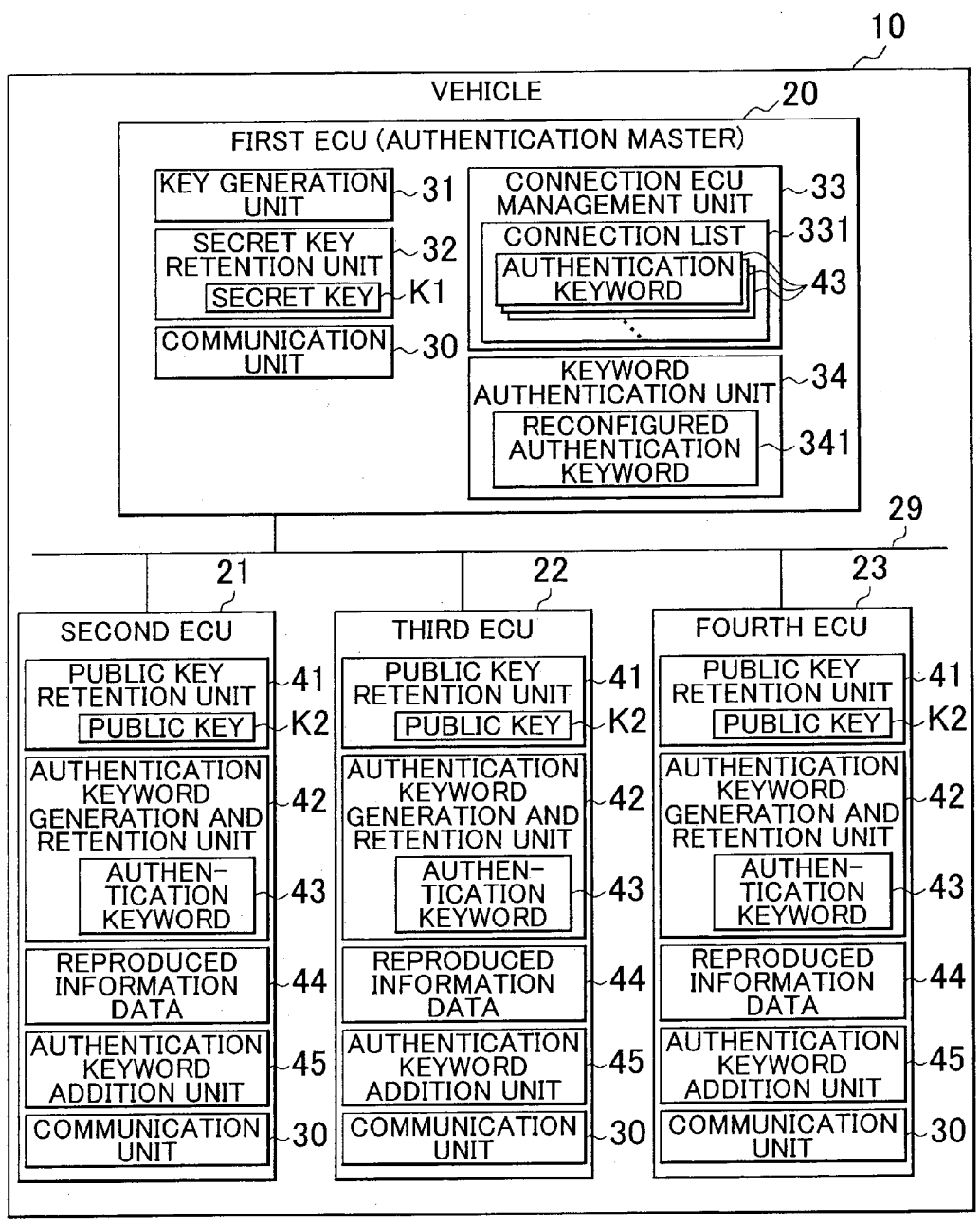
FIG. 1 is a block diagram illustrating a schematic configuration of the vehicle network system according to a first embodiment of the invention.

As shown in FIG. 1, a vehicle 10 is provided with a vehicle network system including first to fourth ECUs 20 to 23 serving as units performing electronic control of devices installed on the vehicle and a network 29 that network connects the first to fourth ECUs 20 to 23 so that the ECUs can communicate with each other.

The network 29 has specifications suitable for installing the network on the vehicle 10. In the present embodiment, a control area network (CAN) for vehicles, which is a conventional network, is used as the network 29. The CAN for vehicles has a maximum communication capacity of, for example, 500 kilobits per 1 sec (time) and can include maximum 8-byte (64-bit) data in one data frame (about 5 to 13 bytes) as specifications thereof. Further, in the present embodiment, data included in a data frame (transmission signal) that is transmitted to the network 29 is the so-called vehicle information data such as vehicle speed, engine temperature, or the results of processing performed by the ECUs.

The first to fourth ECUs 20 to 23 are provided with communication units 30 that communicate with each other via the network 29. Since communication units 30 of the first to fourth ECUs 20 to 23 have the same functions, only the communication unit 30 of the first ECU 20 that functions as the first control unit will be explained in detail below, and the explanation of the communication units 30 of the second to fourth ECUs 21 to 23 functioning as the second control units will be omitted for the sake of convenience of explanation.

The communication unit 30 of the first ECU 20 receives transmission signals serving as communication signals including vehicle information data that are transmitted from the second to fourth ECUs 21 to 23, extracts the vehicle information data contained in the transmission signal that has been received, and enables data processing of various types in the first ECU 20. For this purpose, the communication unit 30 removes data to be used for processing of network communication, such as "CAN ID", from the transmission signal constituted by the format of CAN protocol received from the network 29, thereby extracting the vehicle information data, and stores the extracted vehicle information data in a storage device of the first ECU 20 in a state in which the vehicle information data are associated with the "CAN ID". The "CAN ID" is associated in advance at a one-to-one ratio with one vehicle information data. Therefore, the first ECU 20 can determine the meaning of the extracted vehicle information data on the basis of the "CAN ID" associated therewith. Conversely, the communication unit 30 of the first ECU 20 generates a transmission signal including vehicle information data transmitted from the first ECU 20 when the vehicle information data are transmitted and transmits the generated transmission signal to the network 29. Thus, the communication unit 30 of the first ECU 20 adds "CAN ID" or the like to the vehicle information data to be transmitted, generates a transmission signal having a CAN protocol format, and transmits the generated transmission signal to the network 29. As a result, the first to fourth ECUs 20 to 23 exchanges vehicle information data of various types with each other via the network 29.

The first to fourth ECUs 20 to 23 are, for example, an engine ECU, a brake ECU, a steering ECU, and an drive aid (navigation system) ECU. The first to fourth ECUs 20 to 23 are configured around a microcomputer provided with a computation device, a storage device, a nonvolatile memory (ROM), a volatile memory (RAM), and a nonvolatile storage device (flash memory or hard disk). Information processing of various types that is based on data and programs stored in the storage device or memory devices is executed by the microcomputer.

Further, the vehicle network system of the present embodiment is provided with a configuration for increasing the reliability of communication signals. Thus, the first ECU. 20 has a function of monitoring the transmission signals flowing to the network 29 and estimating the reliability of the transmission signals, that is, an authentication master function. Meanwhile, the second to fourth ECUs 21 to 23 have a function of adding an authentication keyword or the like that is used for authentication to the transmission signal and transmitting the transmission signal with the authentication keyword added thereto in order to enable to first ECU 20 serving as the authentication master to authenticate the transmission signals from the second to fourth ECUs 21 to 23. The configuration of the second to fourth ECUs 21 to 23 will be described below.

The first ECU 20 is provided with a key generation unit 31 that generates a secret key K1 and a public key K2, which form a pair, and a secret key retention unit 32 that holds the secret key K1 generated by the key generation unit 31. The first ECU 20 is also provided with a connection ECU management unit 33 that registers and manages the ECU connected to the network 29 each time the vehicle 10 is started and a keyword authentication unit 34 that performs estimation (authentication) processing of the reliability of the transmission signals on the basis of the authentication keyword encrypted by the public key K2.

The key generation unit 31 generates a pair of the secret key K1 and public key K2 (key pair) that are used in a public key encryption system such as RSA encryption, which enables encryption and digital signature, and for example uses a computation method designated by the RSA encryption system to generate a key pair to be used for the RSA encryption. Thus, where the key pair is used for encryption, plain text can be encrypted with the public key K2 and the encrypted plain text can be decoded by the secret key K1. Further, where the key pair is used for a digital signature, plain text encrypted by the secret key K1 can be decoded by the public key K2.

Further, the generation of the key pair with the key generation unit 31 is executed on condition that initialization of the vehicle network system is executed. After the key generation unit 31 has generated a pair of the secret key K1 and public key K2 as a key pair, the generated public key K2 is transmitted once to the network 29, that is, the public key K2 is made public once. Thus, in the present embodiment, the public key K2 is made public only once in the vehicle network system on condition that the initialization of the vehicle network system has been executed, and is not public at all times like a typical public key used in the internet.

The initialization of the vehicle network system serving as a condition for the key generation unit 31 to generate a key pair is initialization processing performed with respect to the vehicle network system in order to activate the configured vehicle network system. For example, the initialization of the vehicle network system is purposefully executed, for example, only when a battery is connected to the vehicle for shipping or when vehicle preparation accompanied by reconfiguration of the vehicle network system is performed by a car dealer. In other cases, for example, when a vehicle is started by an ignition key or the like to use the vehicle, or when the battery is replaced without any relation to the reconfiguration of the vehicle network system, the initialization of the vehicle network system is not executed and therefore, the generation of the key pair by the key generation unit 31 is not performed.

The secret key retention unit 32 receives the secret key K1, from among the pair of keys generated by the key generation unit 31, from the key generation unit 31 when the key pair is generated and usably holds the secret key only in the first ECU 20.

The connection ECU management unit 33 receives, via the network 29, an authentication keyword 43 including identification information on each ECU transmitted by the ECU each time the vehicle network system is started following the operation of starting the vehicle 10 with an ignition key or the like. The connection ECU management unit 33 then determines that the ECU specified on the basis of the identification information obtained from the received authentication keyword 43 is connected to the network 29, registers this ECU in a connection list 331, and usably manages the connection list 331 in the first ECU 20 during the operation of the vehicle network system. In the present embodiment, the authentication keyword 43 is encrypted by the public key K2, but decoded by the secret key K1 that has been held in the secret key retention unit 32, thereby making it possible to acquire the ECU identification information included therein.

The keyword authentication unit 34 decodes, as necessary, the authentication keyword 43 encrypted by the public key K2 with the secret key K1 held in the secret key retention unit 32. Further, the keyword authentication unit 34 monitors the transmission signals flowing in the network 29 and acquires the authentication keyword 43 that has been added to the transmission signals. In the present embodiment, parts (extraction keywords) of the authentication keyword 43 are added to the transmission signals. Therefore, the parts of the authentication keyword 43 are acquired from the transmission signal, and the acquired partial authentication keywords 43 are successively connected to the transmission signals having the same "CAN ID", thereby reconfiguring a full-size reconfigured authentication keyword 341.

Further, the keyword authentication unit 34 compares the full-size reconfigured authentication keyword 341 with the authentication keyword 43 held in the connection ECU management unit 33. The keyword authentication unit 34 may perform the comparison while the reconfigured authentication keyword 341 and the authentication keyword 43 are still encrypted, or may perform the comparison after decoding. As a result, it is verified whether or not the ECU that has transmitted the transmission signal is the ECU that has transmitted the authentication keyword 43 managed in the connection list 331. Thus, when the reconfigured authentication keyword 341 matches the authentication keyword 43, the ECU that has transmitted the transmission signal is verified to be the ECU that has transmitted the authentication keyword 43 managed in the connection list 331. Meanwhile, where the reconfigured authentication keyword 341 and the authentication keyword 43 do not match, it means that a improper transmission signal has been added to the network 29 because of unauthorized access or the like and it is determined that the reliability of the transmission signals cannot be ensured.

Further, when the reconfigured authentication keyword 341 and the authentication keyword 43 do not match, the keyword authentication unit 34 determines that the reconfigured authentication keyword 341 is unauthorized and prohibits the use of the transmission signal with the "CAN ID" having the reconfigured authentication keyword 341 added thereto. For example, the keyword authentication unit 34 prohibits the use in the vehicle network system of the ECU having allocated thereto the "CAN ID" that is prohibited for use, or broadcasts (notifies) information indicating that the transmission signal is unauthorized to the network 29, thereby cutting off the ECU that is the prohibition object from the vehicle network system or causing the system to ignore the transmission signal that is the prohibition object. As a result, the transmission signal having the "CAN ID" that is the prohibition object does not flow into the network 29 or is not handled thereby. Further, where the keyword authentication unit 34 transmits the "CAN ID" that is the prohibition object to the network 29, the "CAN ID" that is the prohibition object is transferred to the second to fourth ECUs 21 to 23 and the transmission signals having the "CAN ID" that is the prohibition object are prohibited for use in the ECUs.

A function relating to estimation of the reliability of the transmission signals in the second to fourth ECUs 21 to 23 will be explained below. Since the second to fourth ECUs 21 to 23 have the same function, the explanation below will be provided only with respect to the second ECU 21. For the sake of convenience of explanation, when the third and fourth ECUs 22 and 23 are explained, the same and corresponding functions are assigned with same reference numerals and detailed explanation thereof is herein omitted.

The second ECU 21 is provided with a public key retention unit 41 that receives and holds the public key K2 transmitted from the first ECU 20 and an authentication keyword generation and retention unit 42 that generates and holds the authentication keyword 43 by using the public key K2. The second ECU 21 is also provided with vehicle information data 44 constituted by vehicle speed, engine temperature, or processing results obtained with the ECU and an authentication keyword addition unit 45 that successively adds parts of the authentication keyword 43 to the vehicle information data 44.

The public key retention unit 41 acquires the public key K2 transmitted from the first ECU 20 when the initialization of the vehicle network system is executed, retains the acquired public key K2, and enables the use thereof in the second ECU 21.

Figure 2:
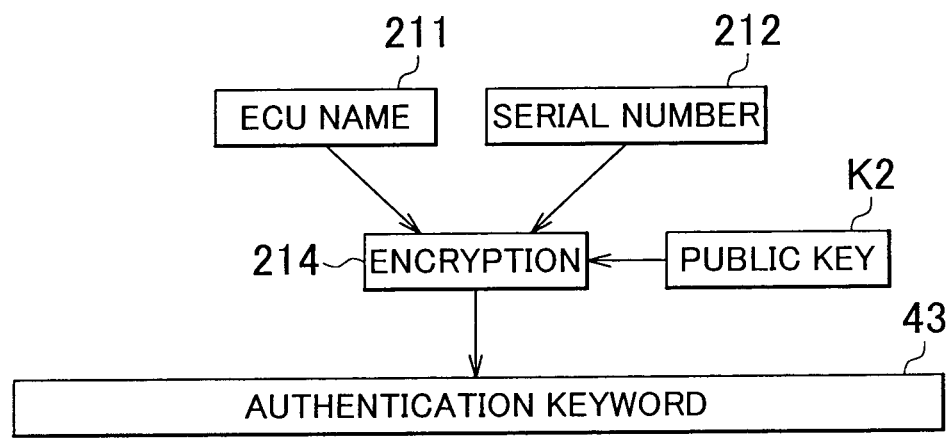
FIG. 2 is a schematic diagram illustrating schematically how an ECU of the vehicle network system generates an authentication keyword.

As shown in FIG. 2, the authentication keywords generation and retention unit 42 encrypts (214) information of at least one of, for example, an ECU name 211 or serial number 212, which is the intrinsic information capable of specifying the second ECU 21, by using the public key K2 that has been held in the public key retention unit 41 and generates and holds the authentication keyword 43. Further, the authentication keyword generation and retention unit 42 transmits the authentication keyword 43 that has been held therein to the network 29 each time the vehicle network system is started following the start of the vehicle 10 with the ignition key. The second ECU 21 thereby registers the authentication keyword 43 of the second ECU 21 in the connection list 331 of the connection ECU management unit 33 of the first ECU 20.

The vehicle information data 44 represent one of vehicle information from among the vehicle speed, engine temperature, or processing results obtained with the ECU; one type of the vehicle information data 44 is associated in advance with one "CAN ID". As a result, in the vehicle network system, by referring to the "CAN ID", it is possible to specify correctly, provided that an unauthorized access is absent, the type of vehicle information included in the vehicle information data 44 and the ECU that has transmitted the vehicle information data 44.

Figure 3A:
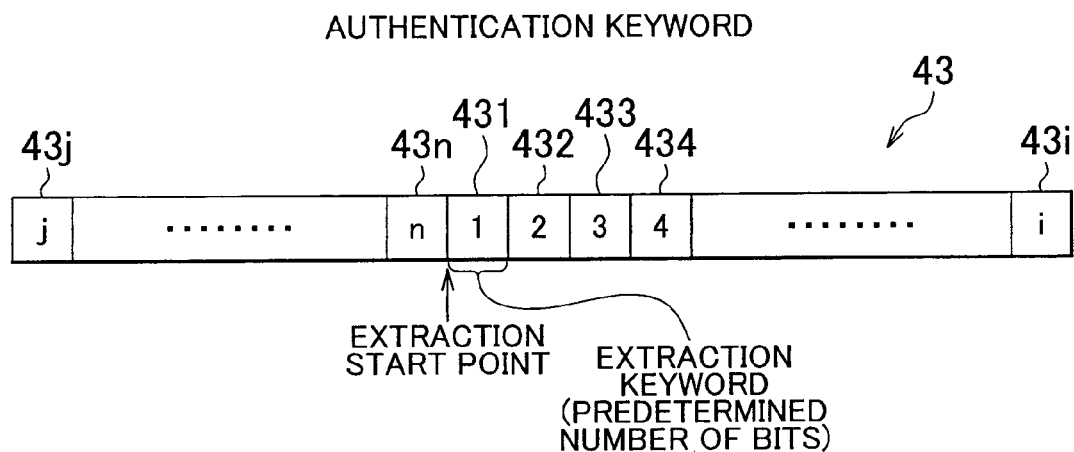
FIGS. 3A and 3B illustrate divided authentication-keywords added by the ECU of the vehicle network system to the transmission signals, FIG. 3A being a schematic diagram illustrating schematically how an extraction keyword is extracted by dividing the authentication keyword, and FIG. 3B being a schematic diagram illustrating schematically the configuration of data format of the transmission signal having the extraction keyword added thereto.
Figure 3B:
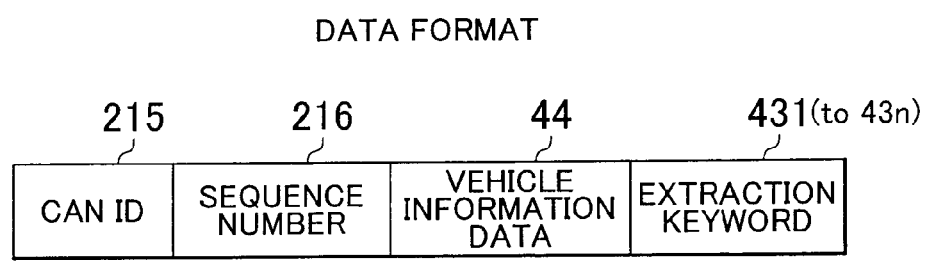

The authentication keyword addition unit 45 successively adds the extraction keywords as parts of the authentication keyword 43 to the vehicle information data 44 that are transmitted from the second ECU 21 and have the "CAN ID" of the same assigned thereto. More specifically, as shown in FIG. 3A, the authentication keyword addition unit 45 sets an "extraction start point" at a random position of the authentication keyword 43 and acquires extraction keywords 431 to 43$n$ as n pieces of authentication information by successively extracting the keywords by a predetermined number of bits from the "extraction start point". In this case, the extraction (acquisition) of the "extraction keywords" is repeated till the extraction position reaches the very end of the authentication keyword 43, and at this time the extraction position is returned to the beginning of the authentication keyword 43, and the extraction (acquisition) of the "extraction keywords" is repeated till the extraction position reaches "extraction start point". The extraction keywords 431 to 43$n$ of a predetermined number of bits are thus extracted n times (predetermined number) from the authentication keyword 43. Then, as shown in FIG. 3B, the authentication keyword addition unit 45 successively adds one extraction keywords 431 (to 43$n$) to the vehicle information data 44. By so adding one extraction keywords 431 (to 43$n$) to the vehicle information data 44, it is possible to decrease the amount of transmitted data by comparison with the case where the authentication keywords 43 itself is added.

As a result, the vehicle information data 44 and the extraction keywords 431 (to 43$n$) are transmitted to the communication unit 30, a CAN ID 215 and a sequence number 216 are added thereto in the communication unit 30, a transmission signal constituted by data format of CAN protocol is created, and the created transmission signal is transmitted to the network 29.

The above-mentioned "extraction start point" can be set randomly. For example, the adjacent bits can be successively computed by an exclusive OR(XOR) with respect to a bit row of the public key K2, and the computation result value is obtained at a point of time in which the number of bits of the computation result becomes equal to a predetermined desired number of bits. The "extraction start point" is then set to a position obtained by shifting from the head bit of the authentication keyword 43 to the computation result value that has been obtained in the above-described manner.

Figure 4A:
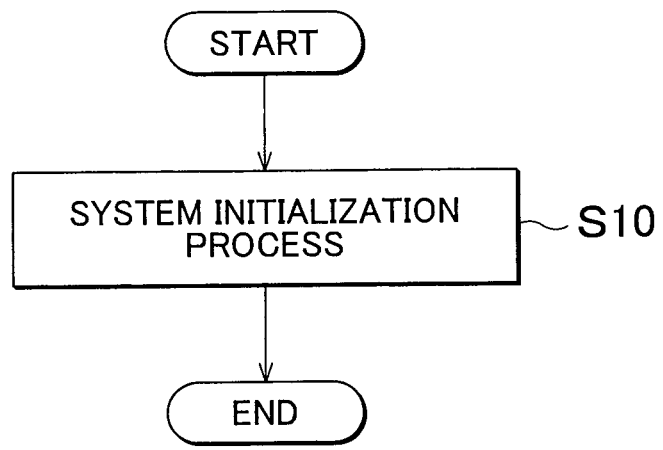
FIGS. 4A and 4B are flowcharts illustrating the step of processing performed to estimate the reliability of the communication signals in the vehicle network system, FIG. 4A being a flowchart illustrating the step of system initialization processing, and FIG. 4B being a flowchart illustrating the step of processing performed to estimate the reliability of the communication signals.
Figure 4B:
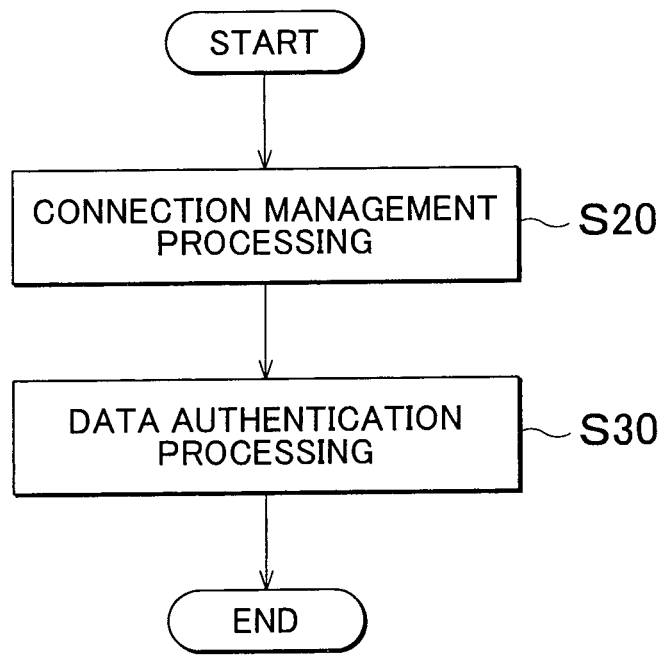
Figure 5:
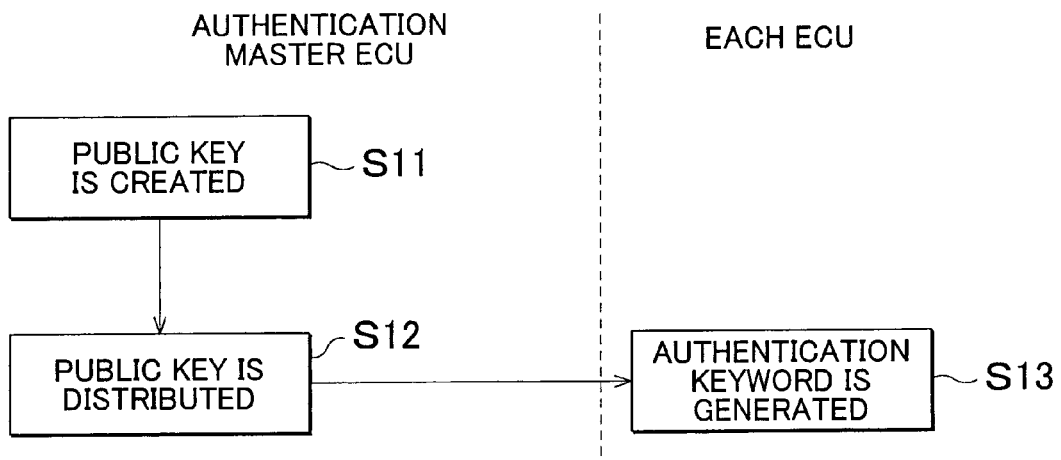
FIG. 5 is a sequence diagram illustrating the system initialization processing of the vehicle network system.

The operation of the vehicle network system configured in the above-described manner will be explained below with reference to FIGS. 4 to 7. As shown in FIG. 4A, after the vehicle network system has been constructed, system initialization processing is executed to activate the system (step S10 in FIG. 4A). In the system initialization processing, as shown in FIG. 5, the first ECU 20, which is the authentication master ECU, generates a pair of the secret key K1 and the public key K2 (step S11 in FIG. 5). The first ECU 20 holds the generated secret key K1 in the secret key retention unit 32 thereof and distributes the public key K2 to the second to fourth ECUs 21 to 23 via the network 29 (step S12 in FIG. 5). The second to fourth ECUs 21 to 23 in which the public key K2 has been set create respective authentication keywords 43 on the basis of the set public key K2 at a timing at which the public key K2 is set and hold the created authentication keywords (step S13 in FIG. 5). The execution of the system initialization processing ends when the above-described processing is completed.

Where the vehicle network system is started in the usual manner after the execution of the initialization of the vehicle network system, as shown in FIG. 4B, the vehicle network system performs the connection management processing (step S20 in FIG. 4B) and then performs the data authentication processing (step S30 in FIG. 4B).

Figure 6:
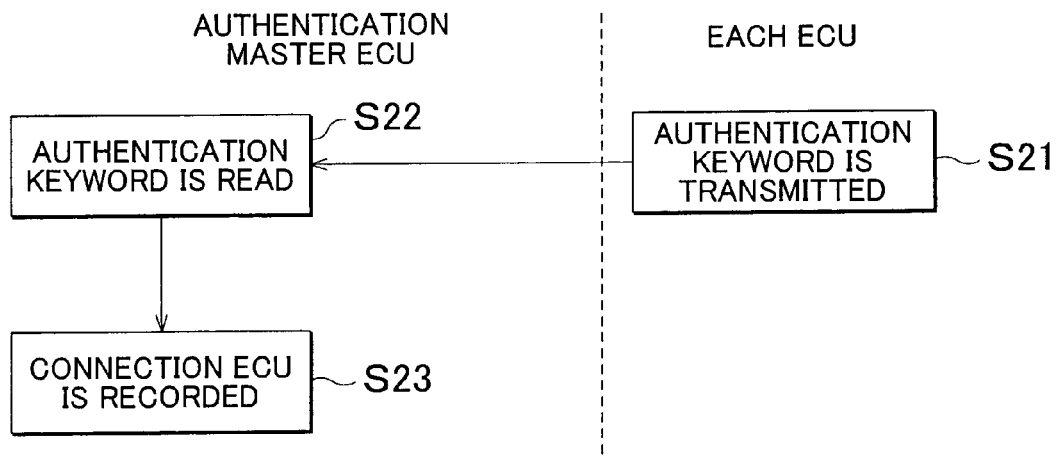
FIG. 6 is a sequence diagram illustrating connection management processing of the vehicle network system.

In the connection management processing, as shown in FIG. 6, following the start of the vehicle network system, the authentication keywords 43 held by the second to fourth ECUs 21 to 23 are transmitted to the network 29 (step S21 in FIG. 6). The first ECU 20 receives the authentication keywords 43 of the second to fourth ECUs 21 to 23, decodes the received authentication keywords with the secret key K1, specifies the ECU which are the transmission sources (step S22 in FIG. 6) and also associates the authentication keywords 43 with the specified ECU and registers them in the connection list 331 (step S23 in FIG. 6). As a result, an ECU for which the public key K2 could not be acquired during execution of the initialization of the vehicle network system, for example, an ECU connected after the initialization of the vehicle network system has been executed, will not be registered in the connection list 331, thereby making it possible to distinguish an ECU that has not been authorized for connection to the network 29.

Figure 7:
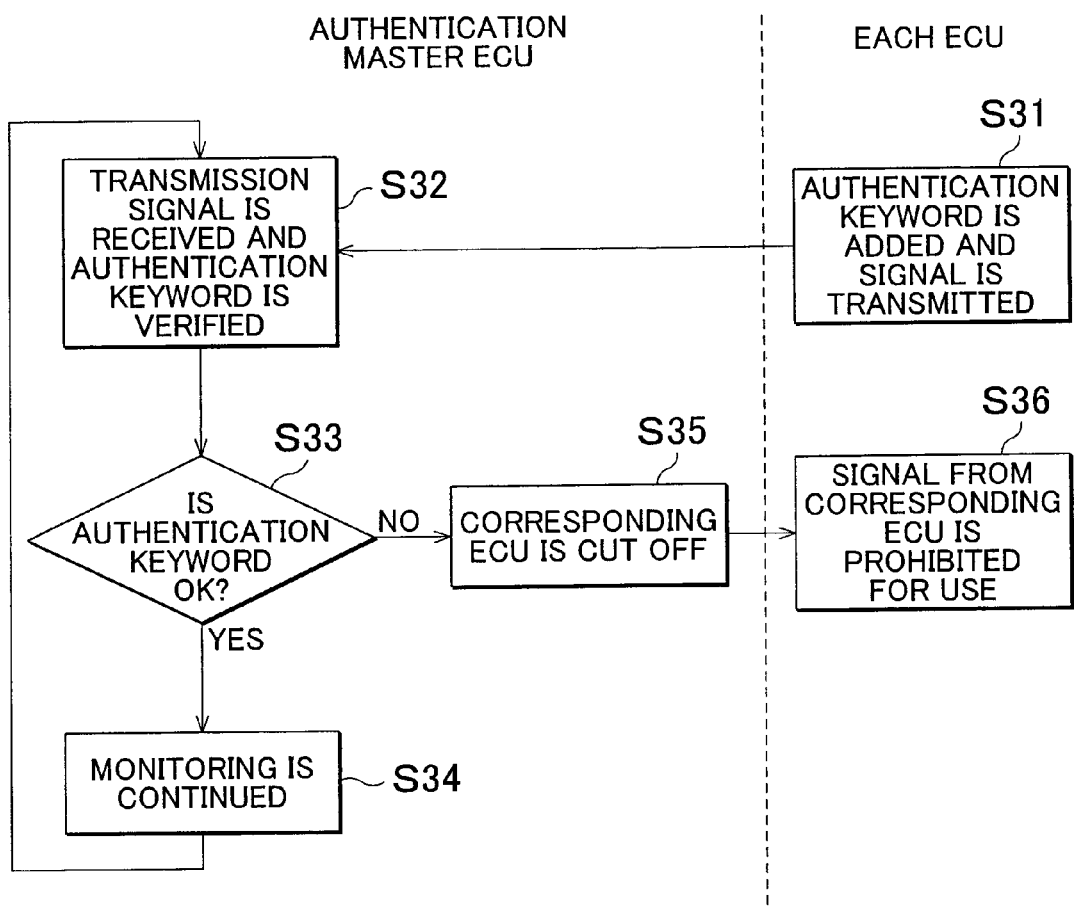
FIG. 7 is a sequence diagram illustrating data authentication processing of the vehicle network system.

In the data authentication processing, as shown in FIG. 7, the second to fourth ECUs 21 to 23 transmit transmission signals having the extraction keywords 431 (to 43n) added thereto (step S31 in FIG. 7). The first ECU 20 monitors the transmission signals having the extraction keywords added thereto, and compares the reconfigured authentication keywords 341 that are obtained by successive acquisition and reconfiguration of the extraction keywords 431 (to 43n) for each "CAN ID" with the authentication keyword 43 that has been held in the connection list 331, thereby verifying the reliability of the transmission signals (step S32 in FIG. 7). Thus, when the reconfigured authentication keyword 341 and the authentication keyword 43 match (YES in step S33 in FIG. 7), the first ECU 20 determines that the reconfigured authentication keyword 341 is appropriate and continues monitoring the transmission signals (step S34 in FIG. 7).

Meanwhile, when the reconfigured authentication keyword 341 and the authentication keyword 43 do not match (NO in step S33 in FIG. 7), the first ECU 20 determines that the reconfigured authentication keyword 341 is unauthorized and cuts off the ECU having the "CAN ID" with the reconfigured authentication keyword 341 added thereto from the vehicle network system (step S35 in FIG. 7). The first ECU 20 also prohibits the use of the transmission signal having the "CAN ID" that is the prohibition object in the second to fourth ECUs 21 to 23 (step S36 in FIG. 7).

As a result, in the vehicle network system of the present embodiment, the first ECU 20 monitors as to whether or not the transmission signals transmitted to the network 29 include a transmission signal in which a "CAN ID", which is added by the second to fourth ECUs 21 to 23 to the transmission signals, has been added to improper data. When a fake transmission signal is included in the transmission signals, the first ECU 20 determines the fake signal and prohibits the use of the fake transmission signal in the network 29.

As mentioned, hereinabove, the below-described effects can be obtained with the vehicle network system of the present embodiment. (1) Since the public key K2 is set in the second to fourth ECUs 21 to 23 when the initialization processing of the vehicle network system is executed, the second to fourth ECUs 21 to 23 that transmit transmission signals together with the extraction keywords 431 to 43n are specified as units that have been included in the vehicle network system when the initialization processing was executed. As a result, the transmission signals transmitted upon the addition of the extraction keywords 431 to 43n thereto are specified as transmission signals transmitted from the second to fourth ECUs 21 to 23 that have been included in the vehicle network system when the initialization processing was executed and therefore the reliability thereof can be ensured. As a result, the reliability of the transmission signals can be increased.

(2) Further, where the extraction keywords 431 to 43n (authentication keyword 43) that have once been created are stored, it is not necessary to create the extraction keywords 431 to 43n again. Therefore, during subsequent transmission of transmission signals, there is no increase in load required to create the extraction keywords 431 to 43n and the processing capacity of the second to fourth ECUs 21 to 23 can be maintained at the conventional level.

(3) Furthermore, since the contents of extraction keywords 431 to 43n that have been encrypted by the public key K2 have not been falsified, the reliability of the transmission signals having the extraction words added thereto is also increased.

(4) Since the extraction keywords 431 to 43n (authentication keyword 43) are transmitted upon division, the amount of communication data that is considered necessary for ensuring the reliability can be reduced by comparison with the case where all of the extraction keywords 431 to 43n are added to each transmission signal to be transmitted. In particular, with a vehicle network system that is designed with minimum necessary capacity and functions, the reliability of the transmission signals can be increased, while suppressing the increase in cost associated with the enhancement of functions for increasing the reliability of the transmission signals.

(5) Since the first ECU 20 generates the secret key K1 and the public key K2 during execution of the initialization processing, the secret key K1 and the public key K2 cannot leak beforehand. (6) Since the public key K2 is distributed during the initialization processing, the public key K2 can be distributed accurately and efficiently to the appropriate second to fourth ECUs 21 to 23 constituting the vehicle network system.

(7) Since the extraction keywords 431 to 43n (authentication keyword 43) are created when the public key K2 is set, no processing load for creating the extraction keywords 431 to 43n (authentication keyword 43) is generated when the transmission signals are transmitted and the increase in processing load in the second to fourth ECUs 21 to 23 can be suppressed.

(8) The first ECU 20 authenticates the second to fourth ECUs 21 to 23, which transmit transmission signals necessary to estimate the reliability, by the authentication keyword 43, which is transmitted prior to the transmission of the transmission signals, each time the vehicle network system is started, thereby making it possible to perform the reliability estimation of the transmission signals that is not affected, for example, by changes in the system configuration. Further, in this case, the second to fourth ECUs 21 to 23 that transmit the transmission signals for which the estimation of the reliability is necessary are not required to be registered in advance in the first ECU 20. Therefore, flexibility of the system is also increased.

(9) When a device pretending to be the second to fourth ECUs 21 to 23 is connected to the vehicle network system and an unauthorized signal (fake signal) is transmitted to the vehicle network system, since the unauthorized signal is prohibited for use, the unauthorized signal is prevented from affecting the vehicle network system. As a result, the unauthorized signal can be prevented from causing inconveniences in the vehicle network system.

Second Embodiment

The second embodiment of the vehicle network system according to the invention will be explained below with reference to FIGS. 8 and 9. The main difference between this embodiment and the above-described first embodiment is that an authentication signal that enables the reliability estimation of the transmission signals is transmitted, as necessary, separately from the transmission signals. Accordingly, this difference between the present embodiment and the above-described first embodiment will be mainly explained below and, for convenience of explanation, the same components will be assigned with same reference numerals and the explanation thereof will be omitted.

Figure 9:
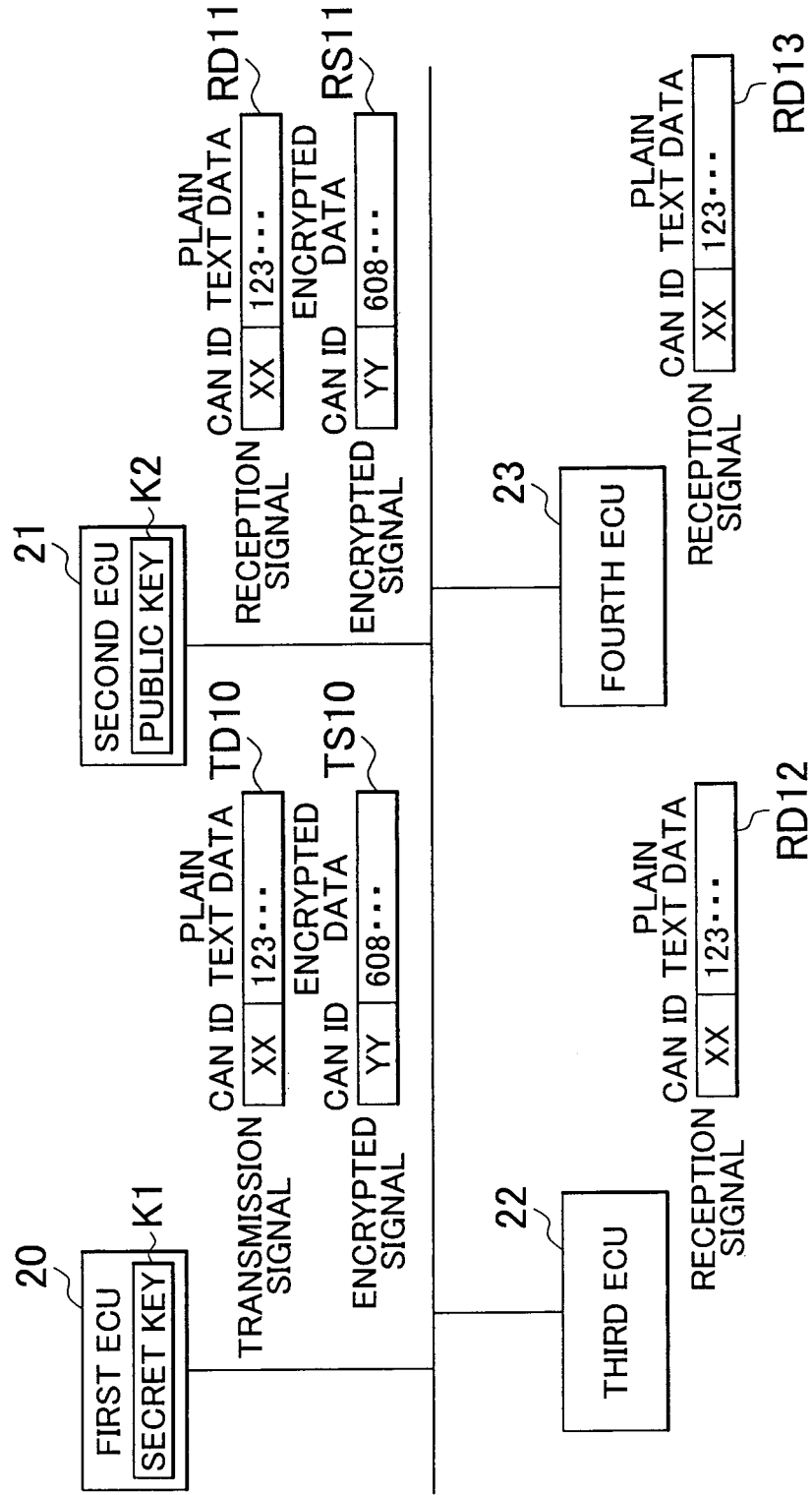
FIG. 9 is a schematic diagram illustrating schematically how signals are transmitted and received in the vehicle network system.

The communication unit 30 of the first ECU 20 is similar to the communication unit 30 of the above-described first embodiment, but in the present embodiment, as shown in FIG. 9, "XX" is set as a value of "CAN ID" for addition to a transmission signal TD10 serving as a communication signal and also "YY" is set as a value of "CAN ID" for addition to an encrypted signal TS10. This value "YY" is an identifier associated with the value "XX", and in the vehicle network system, the encrypted signal TS10 in which the value "YY" is set in the "CAN ID" is defined in advance as the so-called authentication signal, which is the signal for estimating the reliability of the transmission signal TD10 having the value "XX".

Figure 8:
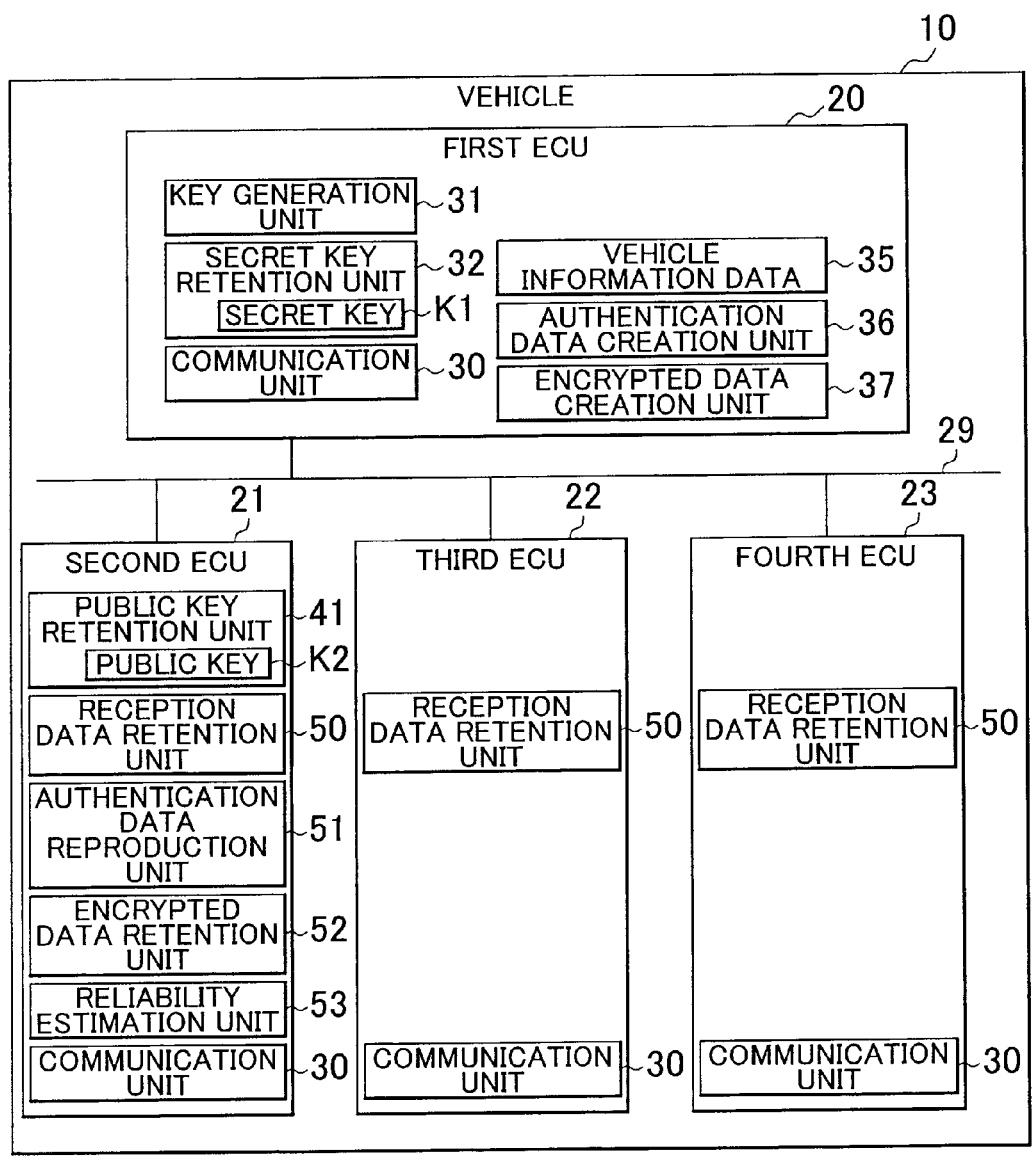
FIG. 8 is a block diagram illustrating a schematic configuration of the vehicle network system according to a second embodiment of the invention.

As shown in FIG. 8, the key generation unit 31 that generates the secret key K1 and the public key K2 that form a pair and the secret key retention unit 32 that holds the secret key K1 generated by the key generation unit 31 are provided in the first ECU 20 serving as the first control unit. Further, the first ECU 20 is also provided with vehicle information data 35 constituted by vehicle speed, engine temperature, or processing results obtained with the ECU, an authentication data generation unit 36 that generated authentication data for authenticating the transmission source of the vehicle information data 35, and an encrypted data creation unit 37 that creates encrypted data serving as an authentication signal from the authentication data.

The key generation unit 31 generates a pair of the secret key K1 and the public key K2 (key pair) that are used in a public key encryption system such as RSA encryption, which enables encryption and digital signature, and for example uses a computation method designated by the RSA encryption system to generate a key pair to be used for the RSA encryption, in the same manner as in the above-described first embodiment. Thus, where the key pair is used for encryption, plain text can be encrypted with the public key K2 and the encrypted plain text can be decoded by the secret key K1. Further, where the key pair is used for a digital signature, plain text encrypted by the secret key K1 can be decoded by the public key K2.

The vehicle information data 35 represent any type of vehicle information from among the vehicle speed, engine temperature, or processing results obtained with the ECU, and one "CAN ID" is associated in advance with one type of the vehicle information data 35. As a result, in the vehicle network system, by referring to the "CAN ID", it is possible to specify correctly, provided that an unauthorized access is absent, the type of vehicle information included in the vehicle information data 35 and the ECU (for example, the first ECU 20) that has transmitted the vehicle information data 35.

The authentication data creation unit 36 takes a hash value of the vehicle information data 35 obtained by using a predetermined hash function as authentication data for authenticating that the transmission source of the vehicle information data 35 is the first ECU 20. The hash function generates a pseudorandom number (hash number, message digest) that has been determined in advance from the vehicle information data 35. Theoretically, it is extremely difficult to generate data (for example, improper vehicle information data) having the same hash value. Therefore, the authentication data created by the hash function can be guaranteed to have been created, for example, from the vehicle information data 35.

The encrypted data generation unit 37 generates encrypted data from the authentication data on the basis of the secret key K1 held in the secret key retention unit 32. Since the encrypted data can be decoded only by the public key K2, where the encrypted data can be decoded by the public key K2, these public data can be guaranteed to have been generated by the first ECU 20.

A configuration relating to the function of estimating the reliability of the transmission signal TD10 that is provided in the second ECU 21 serving as the second control unit will be explained below. The third and fourth ECUs 22 and 23 differ from the second control unit in that they are not provided with the function of estimating the reliability of the transmission signals, but other functions are similar to those of the second ECU 21 and therefore the explanation thereof is herein omitted.

The second ECU 21 is provided with the public key retention unit 41 that receives and holds the public key K2 transmitted from the first ECU 20. The second ECU 21 is also provided with a reception data retention unit 50 that holds the vehicle information data 35 included in the transmission signal TD10 transmitted by the first ECU 20 and an authentication data reproduction unit 51 that reproduces authentication data on the basis of the vehicle information data 35 held in the reception data retention unit 50. The second ECU 21 is further provided with an encrypted data retention unit 52 that retains encrypted data included in the encrypted signal TS10 transmitted by the first ECU and a signal reliability estimation unit 53 that estimates the reliability of the transmission signal TD10 on the basis of the authentication data reproduced by the authentication data reproduction unit 51 and the authentication data decoded from the encrypted data.

The reception data retention unit 50 acquires and retains vehicle information data 35 that have been taken out of the transmission signal TD10 by the communication unit 30 that has received the transmission signal TD10 transmitted by the first ECU 20.

The authentication data reproduction unit 51 has a hash function identical to the hash function used by the first ECU 20 to generate the authentication data and generates the hash value (message digest) of the vehicle information data 35 held in the reception data retention unit 50 by using the hash function. Thus, the reception data retention unit 50 generates reproduced authentication data, which are authentication data reproduced on the basis of the vehicle information data 35 and the hash function used by the first ECU 20 to generate the authentication data. Usually, if there is no unauthorized access, the reception data retention unit 50 generates the reproduced authentication data identical to the authentication data generated by the first ECU 20.

The encrypted data retention unit 52 acquires and retains the encrypted data that have been taken out by the communication unit 30, which has received the encrypted signal TS10 transmitted by the first ECU 20, by removing the "CAN ID", which is considered to be necessary for communication, from the encrypted signal TS10. Thus, the encrypted data generated on the basis of the authentication data generated by the first ECU 20 are held.

The reliability estimation unit 53 acquires decoded authentication data, which are authentication data generated by the first ECU 20, by decoding the encrypted data held in the encrypted data retention unit 52 on the basis of the public key K2 retained in the public key retention unit 41. Since the encrypted data that can be decoded by the public key K2 are only the encrypted data that have been encrypted by the secret key K1 of the first ECU 20, the encrypted data that can be adequately decoded by the public key K2 are guaranteed to be the data encrypted using the secret key K1, that is, the data encrypted by the first ECU 20.

The reliability estimation unit 53 then estimates the reliability of the transmission signal TD10 on the basis of comparison of the decoded authentication data obtained by decoding the encrypted data and the reproduced authentication data of the authentication data reproduction unit 51. As a result, where the decoded authentication data and the reproduced authentication data match, the decoded authentication data are guaranteed to have been transmitted by the first ECU 20. Therefore, the vehicle information data 35 used for reproducing the reproduced authentication data are also guaranteed to have been transmitted from the first ECU 20. Further, since the hash values serving as the authentication data match, the plain text data (vehicle information data 35) transmitted by the first ECU 20 as the transmission signal TD10 are also guaranteed not to have been falsified along the way into different data.

Figure 10:
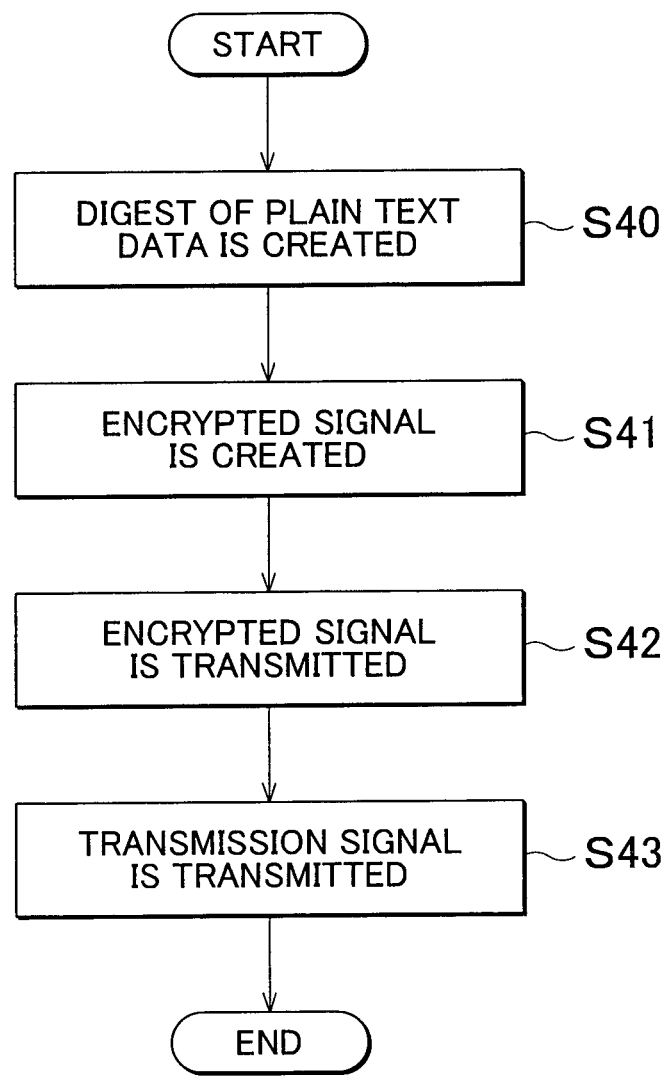
FIG. 10 is a flowchart illustrating the step of processing in which a signal is transmitted in the vehicle network system.
Figure 11:
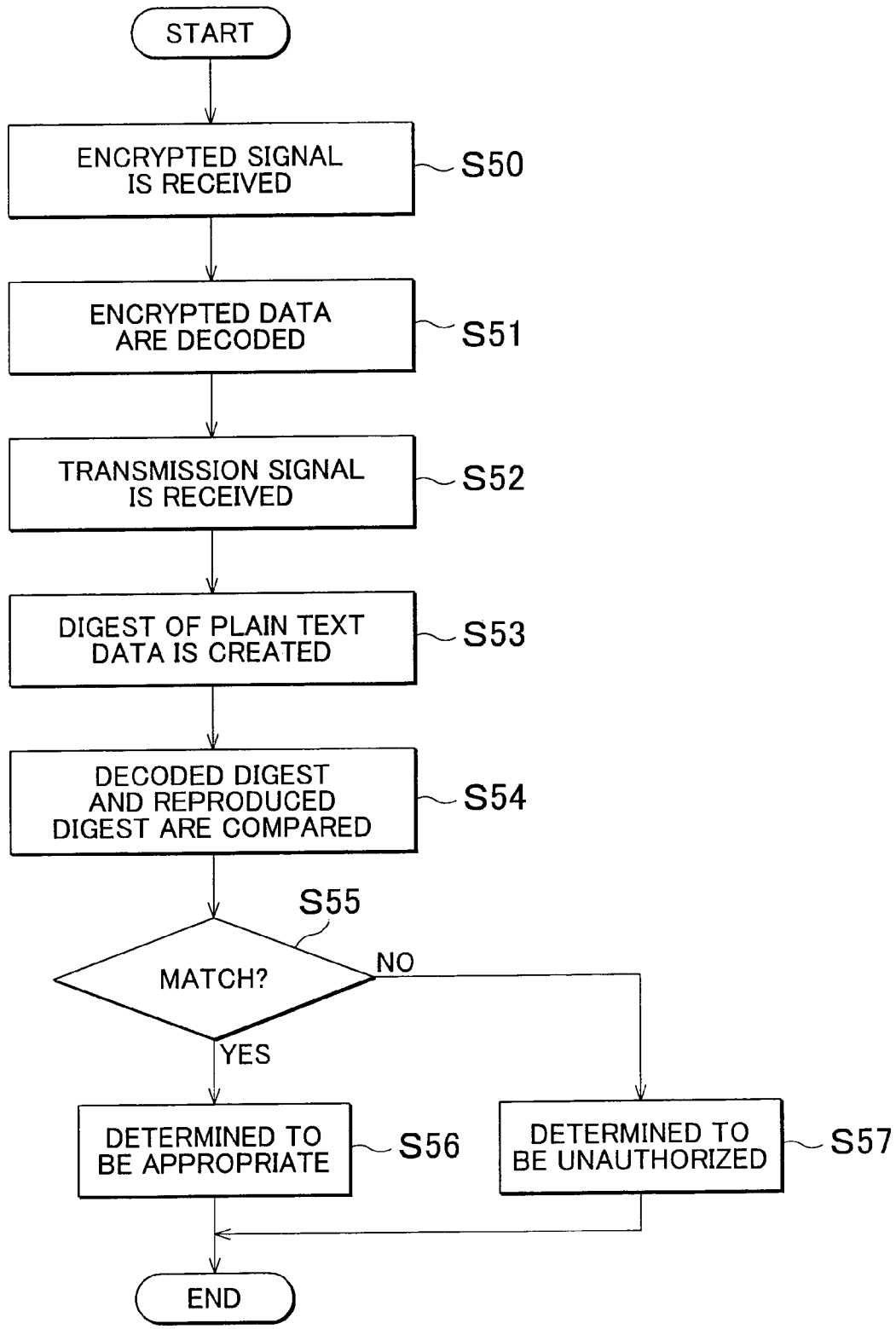
FIG. 11 is a flowchart illustrating a step of processing performed to estimate the reliability of signals on the basis of signals received in the vehicle network system.
Figure 12A:
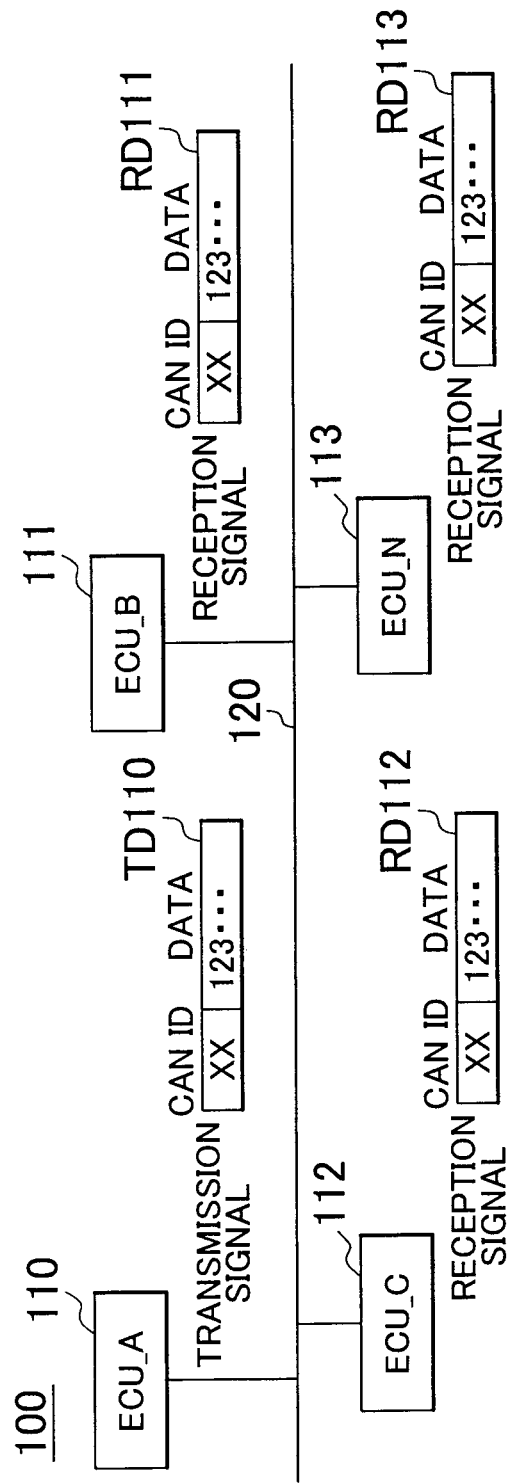
FIGS. 12A and 12B illustrate schematically the configuration of the conventional vehicle network system, FIG. 12A being a schematic diagram illustrating the transmission and reception of signals in a normal state, and FIG. 12B being a schematic diagram illustrating transmission and reception of signals when an unauthorized access has occurred.
Figure 12B:
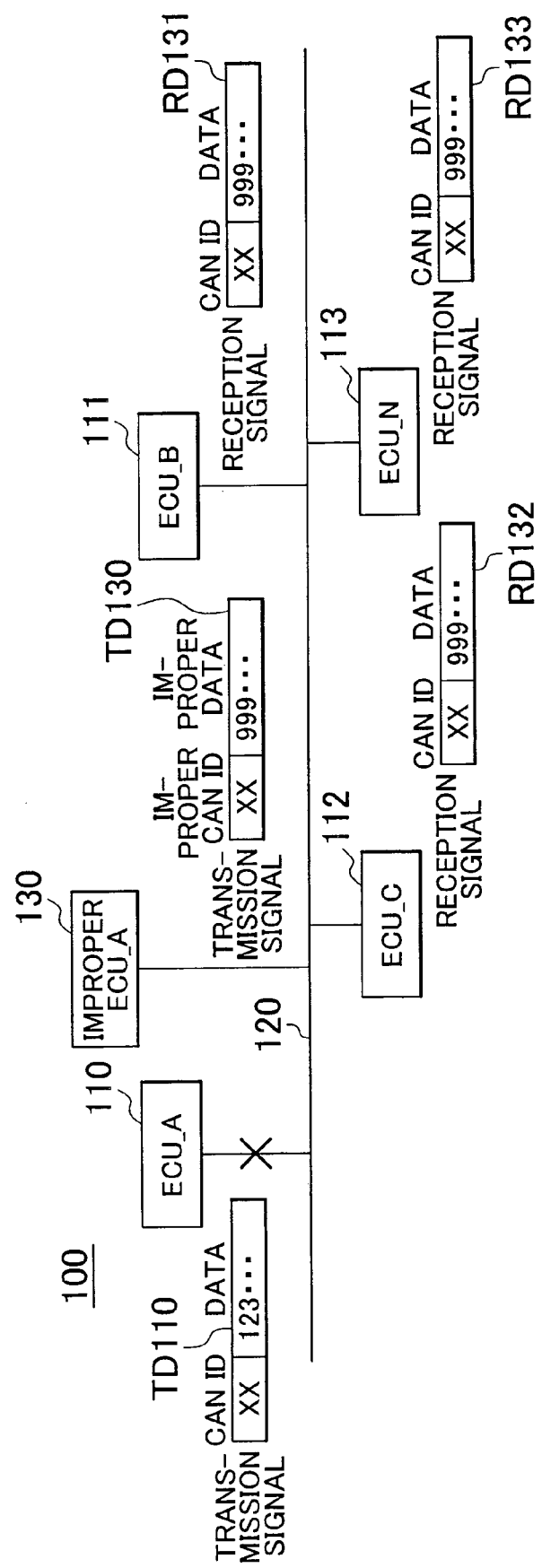

The operation of the vehicle network system of the above-described configuration will be explained below with reference to FIGS. 10 and 11. As shown in FIG. 9, the first ECU 20 generates a pair of the secret key K1 and the public key K2 in the key generation unit 31 when the vehicle network system is initialized and holds the generated secret key K1 in the secret key retention unit 32. Meanwhile, the first ECU 20 transmits the generated public key K2 into the network 29 and sets the public key into the second ECU 21. In the present embodiment, the third and fourth ECUs 22 and 23 do not require the reliability estimation of the transmission signal transmitted from the first ECU 20. Therefore, the public key K2 generated by the first ECU 20 is not set therein.

After such initialization processing has ended, the vehicle network system is started and the transmission signal TD10 that requires the reliability estimation is transmitted from the first ECU 20 to the second ECU 21. The transmission signal TD10 is a signal configured by the usual CAN protocol format and has the value "XX" of the CAN ID and the values "123 . . . " of plain text data (vehicle information data 35). Where the transmission signal TD10 is transmitted to the network 29, the second to fourth ECUs 21 to 23 connected to the same network 29 receive reception signals RD11 to RD13 constituted by the value "XX" of the CAN ID and the values "123 . . . " of plain text data.

However, in the present embodiment, the first ECU 20 transmits to the network 29 the encrypted signal TS10 that is used for the reliability estimation of the transmitted signal TD10 prior to transmitting the transmission signal TD10. Thus, as shown in FIG. 10, the first ECU 20 generates a hash value (message digest) of the vehicle information data 35, which is the plain text data, as authentication data (step S40 in FIG. 10), and generates the encrypted signal TS10 including the encrypted data obtained by encrypting the generated authentication data with the secret key K1 (step S41 in FIG. 10). For example, "608 . . . " as the authentication data are obtained by encrypting the authentication data generated from the pain text data "123 . . . ". Then, the encrypted signal TS10 is created that is configured in the format of CAN protocol having the CAN ID value "YY" and the encrypted data value "608 . . . ". Where the encrypted signal TS10 is created, the first ECU 20 transmits the created encrypted signal TS10 (step S42 in FIG. 10) and also transmits the transmission signal TD10, which is the usual signal corresponding to the encrypted signal TS10 (step S43 in FIG. 10). As a result, the transmission of the transmission signal TD10 and the transmission of the encrypted signal TS10 for estimating the reliability of the transmission signal that are performed by the first ECU 20 are ended.

Meanwhile, the second ECU 21 receives the transmission signal TD10 and the encrypted signal TS10 and also estimates the reliability of the transmission signal TD10 on the basis of the received transmission signal TD10 and the encrypted signal TS10. Thus, as shown in FIG. 11, the second ECU 21 receives the encrypted signal TS10 (step S50 in FIG. 11). By receiving the encrypted signal TS10, the second ECU 21 can predict the transmission of the transmission signal TD10 having the CAN ID value "XX" corresponding to the CAN ID value "YY" of the encrypted signal TS10. Where the encrypted signal TS10 is received, the second ECU 21 decodes the encrypted signal TS10 and obtains the decoded authentication data (step S51 in FIG. 11). Further, the second ECU 21 obtains plain text data (vehicle information data 35) from the transmission signal TD10 corresponding to the encrypted signal TS10 (step S52 in FIG. 11) and also generates a hash value (message digest) of the plain text data (vehicle information data 35) as the reproduced authentication data (step S53 in FIG. 11). Where the decoded authentication data (message digest) and the reproduced authentication data (message digest) are obtained, the second ECU 21 compares these decoded authentication data and reproduced authentication data (step S54 in FIG. 11). When the comparison results indicate that the decoded authentication data and reproduced authentication data match (YES in step S55 in FIG. 11), the transmission signal TD10 is determined to be appropriate (step S56 in FIG. 11). Meanwhile, when the comparison results indicate that the decoded authentication data and reproduced authentication data do not match (NO in step S55 in FIG. 11), the transmission signal TD10 is determined to be unauthorized (step S57 in FIG. 11). As a result, the reliability of the transmission signal TD10 is estimated. The reliability estimation of the transmission signal TD10 transmitted by the first ECU 20 is thus completed.

As mentioned hereinabove, the below-described effects can be obtained with the vehicle network system of the present embodiment.

(10) Since the public key K2 is set when the initialization processing is executed, the first control unit that transmits the public key K2 is specified as the unit that has been included in the vehicle network system when the initialization processing was executed. Further, by comparing the reproduced authentication data generated from the transmission signal TD10 and the decoded authentication data obtained by decoding the encrypted data of the first ECU 20 from the encrypted signal TS10, the second ECU 21 can determine that the transmission source of the transmission signal TD10 is the first ECU 20 and that no falsification have been added to the transmission signal TD10. For example, even if the transmission signal TD10 flowing in the network 29 has been falsified, since the authentication data (encrypted data) of the encrypted signal TS10 corresponding thereto cannot be falsified, the falsification of the transmission signal TD10 can be detected. As a result, a fake signal transmitted from a device pretending to be the first ECU 20 can be detected and the reliability of the communication signals can be increased.

(11) Further, the transmission signal TD10 is itself also transmitted from the first ECU 20 to the network. Therefore, the third and fourth ECUs 22 and 23 that do not estimate the reliability of the transmission signal TD10 can receive and use the transmission signal TD10 from the first ECU 20 in the conventional manner. Therefore, the system that estimates the reliability of the transmission signal TD10 can be easily applied to the already existing vehicle network systems.

(12) The hash function makes it possible to calculate authentication data of adequate size (intensity) from the transmission signal TD10, in particular from the vehicle information data 35. As a result, the flexibility in designing vehicle network systems is increased.

(13) Since the first ECU 20 generates the secret key K1 and the public key K2 when the initialization processing is executed, the secret key K1 and the public key K2 are prevented from leaking beforehand. (14) Since the public key K2 is distributed during the initialization processing, the public key K2 can be distributed accurately and effectively to the appropriate second ECU 21 constituting the vehicle network system.

Other Embodiments

The above-described embodiments can be also implemented in the following modes.

In the above-described embodiments, the case where the network 29 is a CAN is explained by way of example. However, such a configuration is not limiting, and conventional networks suitable for use as networks for vehicles, such as Ethernet™ and FlexRay™, can be also used. Further, the network can use wireless communication, wire communication, or a mixture thereof. As a result the application range of the vehicle network system is expanded and the flexibility in designing the system is increased.

In the first embodiment, the case is explained where the authentication keyword 43 is generated at a timing at which the public key K2 is set, but such a configuration is not limiting and the authentication keyword may be generated at any timing, provided that there is surplus processing capacity in the ECU, the public key is held, and the generation timing is before the addition to the communication signal.

In the above-described embodiments, the case is explained where the public key K2 is made public only once, but such a configuration is not limiting and the public key may be made public a plurality of times, provided that it is possible not to acquire a device that has been added without authorization.

In the first embodiment, the case is explained where the public key K2 is held in the public key retention unit 41, but such a configuration is not limiting and since the public key is not used after the authentication keyword has been generated, the public key may be deleted after the authentication keyword has been generated. Since the public key is thus deleted from the second ECU or the like, the public key is prevented from leaking after the public key distribution and the reliability of the communication signals can be further increased.

In the first embodiment, the case is explained where the extraction keywords 431 (to 43n) are added after the vehicle information data 44 in the transmission signals, but such a configuration is not limiting, and the extraction keywords may be added before the data or at another location, provided that the format enabling communication in the network can be maintained. As a result, the flexibility in adding the extraction keywords to the transmission signal is increased, and the application range for estimating the reliability of the transmission signals is expanded.

In the first embodiment, the case is explained where the first ECU 20 estimates the reliability of the transmission signals of all other ECUs (second to fourth ECUs 21 to 23) connected to the network. However, such a configuration is not limiting, and the first ECU may estimate the reliability of the communication signals of only some (one or a plurality) of other ECUs connected to the network. In this case, the flexibility in designing vehicle network systems is increased. For example, it is not necessary to add extraction keywords to transmission signals other than reliability estimation objects.

In the second embodiment, the case is explained where the reliability of the transmission signals transmitted from the first ECU 20 is estimation by only one ECU (second ECU 21). However, such a configuration is not limiting, and the reliability of the transmission signals transmitted from the first ECU may be estimated by a plurality of ECUs (second to fourth ECUs and the like). As a result, the flexibility in designing vehicle network systems is increased.

In the second embodiment, the case is explained where the encrypted signal TS10 is transmitted by the first ECU 20, which is the transmitting ECU, prior to transmitting the transmission signal TD10, and the second ECU 21, which is the receiving ECU, receives the encrypted signal TS10 prior to the transmission signal TD10. However, such a configuration is not limiting, and the transmitting ECU may transmit the encrypted signal after transmitting the transmission signal and the receiving ECU may receive the encrypted signal after the transmission signal. As a result, the flexibility in designing the vehicle network system is increased.

In the first embodiment, the case is explained where the RSA encryption is used as the public key encryption system, but such a configuration is not limiting, and other conventional public key encryption systems can be used, provided that the relationship is fulfilled such that the plain text encrypted by a public key can be decoded by a secret key. As a result, the flexibility in designing the vehicle network system and applicability thereof are expanded.

In the second embodiment, the case is explained where the RSA encryption is used as the public key encryption system, but such a configuration is not limiting, and other conventional public key encryption systems can be used, provided that the relationship is fulfilled such that the plain text encrypted by a secret key can be decoded by a public key, that is, provided that the system can be used for digital signature. As a result, the flexibility in designing the vehicle network system and applicability thereof are expanded.

In the first embodiment, the case is explained where the authentication master is only the first ECU 20, but such a configuration is not limiting and a plurality of authentication masters may be provided. As a result, security of the vehicle network system can be maintained at a higher level.

In the first embodiment, the case is explained where the first ECU 20 continuously estimates the reliability of the transmission signals, but such a configuration is not limiting and the estimation of the reliability of the transmission signals may be performed as appropriate. For example, the reliability of the transmission signals may be estimated when the frequency of transmission signals flowing in the network changes abnormally. As a result, the transmission signals can be adequately estimated.

In the second embodiment, the case is explained where the "CAN ID" value "YY" is associated with the encrypted signal TS10 corresponding to the transmission signal TD10, but such a configuration is not limiting and the "CAN ID" value used in the encryption signal corresponding to the transmission signal may be also changed according to a predetermined rule. As a result, fraudulent use of the "CAN ID" and deception using the "CAN ID" can be made more difficult.

In the second embodiment, the case is explained where the authentication data are generated by using a hash function, but such a configuration is not limiting and the authentication data may be generated according to a predetermined calculation rule. As a result, the flexibility in designing the vehicle network system is increased.

In the above-described embodiments, the case is explained where a key pair is generated by the first ECU 20, but such a configuration is not limiting and a key pair generated in advance may be also used. Where a key pair generated in advance is used, it may be distributed to each ECU in advance. As a result, the flexibility in designing the vehicle network system is increased.

The invention claimed is:

1. A vehicle network system, comprising:
a plurality of control circuits provided on a vehicle and network-connected to each other communicatively to communicate via a control area network (CAN) protocol format,
the plurality of control circuits including:
a first control circuit that has a secret key from among the secret key and a public key that form a pair and are set by execution of initialization processing for activating the system; and
a second control circuit that has the public key, wherein
a second identifier is allocated to the second control circuit, the second identifier is an identifier is that is added to a communication having the CAN protocol format,
the second control circuit is configured to create authentication information from the public key and information specifying the second control circuit, add the authentication information and the second identifier to the communication which is to be transmitted to another control circuit, and transmit the communication with the authentication information added to the first control circuit via the network; and
the first control circuit is configured to acquire the authentication information that has been added to the communication transmitted from the second control circuit and estimate reliability of the communication on the basis of the acquired authentication information and the secret key, the first control circuit broadcasts an indication that the communication from the second control circuit is not authorized when the communication is determined to be unreliable.

2. The vehicle network system according to claim 1, wherein
the second control circuit is configured to divide the authentication information into a plurality of information pieces, successively add the divided authentication information that has been obtained by division to communications, and transmit the communications with the divided authentication information added; and
the first control circuit is configured to receive successively the communications, reconfigure the authentication information before the division from the divided authentication information and estimate reliability of the communications on the basis of the reconfigured authentication information.

3. The vehicle network system according to claim 1, wherein
the first control circuit is configured to generate the secret key and the public key by execution of the initialization processing and sets the secret key to the first control circuit and sets the public key to the second control device.

4. The vehicle network system according to claim 3, wherein the first control circuit sets the public key to the second control circuit via the network.

5. The vehicle network system according to claim 1, wherein the second control circuit creates the authentication information at a timing at which the public key is set.

6. The vehicle network system according to claim 1, wherein after creating the authentication information, the second control circuit deletes the public key that has been set.

7. The vehicle network system according to claim 1, wherein the second control circuit transmits the authentication information to the network prior to transmitting the communication each time the vehicle network system is started, and the first control circuit is configured to acquire and store the authentication information that has been received prior to receiving the communication from the second control circuit and to estimate reliability of the communication by comparing the stored authentication information with the authentication information added to the communication.

8. The vehicle network system according to claim 1, wherein the broadcast from the first control circuit indicating that the communication transmitted by the second control circuit is not authorized prohibits use of communications from the second control circuit in the vehicle network system.

9. A vehicle network system, comprising:
a plurality of control circuits provided on a vehicle and network-connected to each other communicatively to communicate via a control area network (CAN) protocol format,
the plurality of control circuits including:
a first control circuit that has a secret key from among the secret key and a public key that form a pair and are set by execution of initialization processing for activating the system; and
a second control circuit that has the public key, wherein
a first identifier is allocated to the first control circuit and a second identifier is allocated to the second control circuit, the first identifier and the second identifier are identifiers that are added to a communication having the CAN protocol format, the first identifier and the second identifiers are different from each other, and the second identifier is associated with the first identifier;
the first control circuit is configured to transmit the communication, to which the first identifier is added, to another control circuit via the network and also transmit an authentication communication, to which the second identifier is added, created on the basis of the secret key and original authentication data generated on the basis of the communication; and the second control circuit is configured to receive the communication and the authentication communication and estimate reliability of the communication, based on the added second identifier and the added first identifier, on the basis of comparison of reproduced authentication data generated on the basis of the received communication and decoded authentication data decoded on the basis of the authentication communication and the public key, the second control circuit broadcasts an indication that the communication from the first control circuit is not authorized when the communication is determined to be unreliable.

10. The vehicle network system according to claim 9, wherein the first control circuit is configured to generate the authentication communication by encrypting, with the secret key, the original authentication data calculated by applying a hash function to the communication, and the second control circuit is configured to calculate the reproduced authentication data by applying the hash function to the received communication and estimate reliability of the communication on the basis of comparison of the reproduced authentication data with decoded authentication data obtained by decoding the authentication communication.

11. The vehicle network system according to claim 9, wherein the first control circuit is configured to generate the secret key and the public key by execution of the initialization processing and sets the secret key to the first control circuit and sets the public key to the second control circuit.

12. The vehicle network system according to claim 11, wherein the first control circuit sets the public key to the second control circuit via the network.

* * * * *